Figure 7:
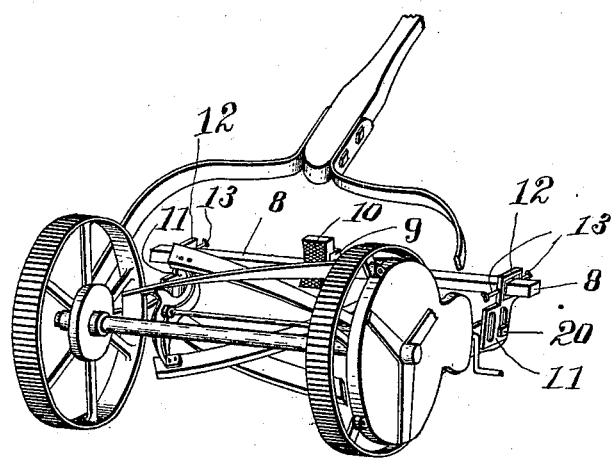

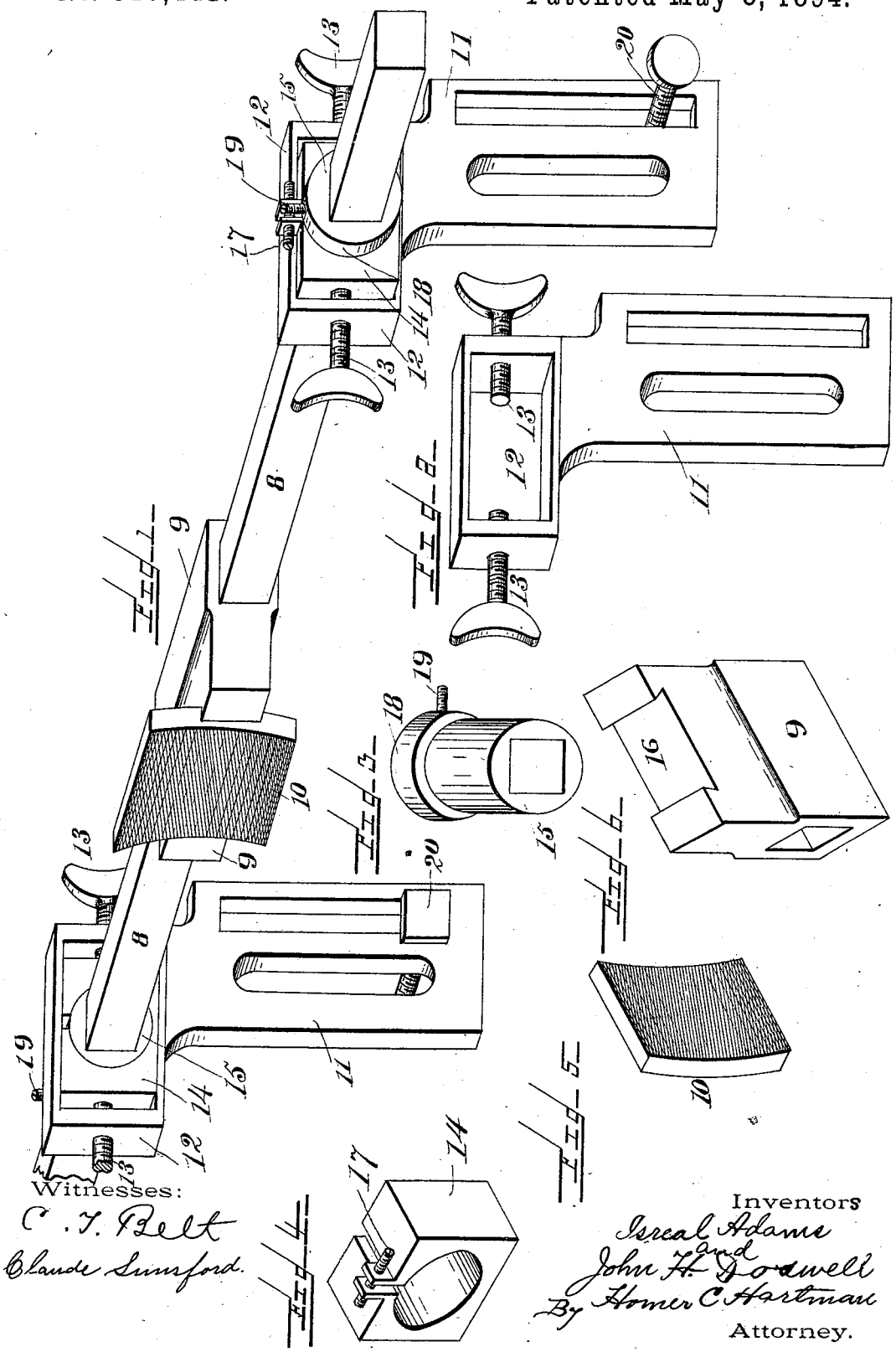

(No Model.) 2 Sheets—Sheet 2.

I. ADAMS & J. H. DOSWELL.
LAWN MOWER SHARPENER.

No. 519,441. Patented May 8, 1894.

Witnesses:
Claude Lunsford.
C. J. Belt.

Isreal Adams
and John H. Doswell
Inventors

By H. C. Hartman
their Attorney.

UNITED STATES PATENT OFFICE.

ISREAL ADAMS AND JOHN H. DOSWELL, OF FORT WAYNE, INDIANA.

LAWN-MOWER SHARPENER.

SPECIFICATION forming part of Letters Patent No. 519,441, dated May 8, 1894.

Application filed December 18, 1893. Serial No. 493,887. (No model.)

*To all whom it may concern:*

Be it known that we, ISREAL ADAMS and JOHN H. DOSWELL, citizens of the United States, residing at Fort Wayne, in the county of Allen, in the State of Indiana, have invented certain new and useful Improvements in Lawn-Mower Sharpeners; and I do hereby declare that the following is a full, clear, and exact description of the invention, which will enable others skilled in the art to which it appertains to make and use the same, reference being had to the accompanying drawings, which form part of this specification.

Our invention relates to improvements in lawn mower sharpeners, for use on the common lawn mower, in which a revolving cylinder is armed with spiral knives, which rotate in contact with the rectilinear edge of a stationary knife placed tangentially thereto; and its objects are to provide a machine which can be readily attached and detached from the mower, and which will hold a file or other sharpening material in adjustable positions to the knives, so that they may be sharpened by being revolved against such material.

The invention consists in the construction and novel combination of parts hereinafter described, pointed out in the appended claims, and illustrated in the accompanying drawings, in which—

Figure 1 is a perspective view of my device. Fig. 2 is a perspective view of the slide bar holder. Fig. 3 is a detail of the adjustable sleeve. Fig. 4 is a detail of the adjustable sleeve holder. Fig. 5 is a perspective view of a file sharpener. Fig. 6 is a perspective view of the follower to which is attached the material for sharpening; and Fig. 7 represents the device attached to a lawn-mower.

Similar numerals of reference refer to similar parts throughout the several views.

Hitherto lawn mowers of the class named, have been sharpened by placing emery on the contact surface or edge of the stationary knife and revolving the knives against it. For this purpose, all or nearly all such mowers are provided with a crank, which is screwed on to the threaded end of the shaft carrying the spiral knives, so that they may be revolved by it without operating the machine. This way of sharpening is imperfect, because the application of the emery is not uniform, and there can be no pressure contact with the spiral knives, without which good work cannot be done.

In sharpening by our device, we revolve the spiral knives in the same way.

In our device the set screws 13 afford means to hold the sharpening material in contact, and with such pressure against the spiral knives as may be required. Its construction is as follows:

8 represents a slide bar, upon which is placed a follower 9 which fits it so as to be held firmly, and yet permit a sliding movement backward and forward upon the bar. That part of the follower fronting the spiral knives of the lawn mower is provided with a file seat 16, which consists of a dove-tailed slot, cut out in such a way that the file plate 10 may be forced therein and thus held firmly in place, as shown in Fig. 1. This file plate is preferably a bastard plate, but it may be either a file or any other instrument or means, which by being pressed against the knives will grind the same and sharpen them, and may be attached in any suitable manner to the follower. For instance, an emery plate or sand paper could be fixed to the inner surface of the follower for the same purpose. But we have found in actual practice that a file plate gives the best results.

The slide bar 8 is fastened suitably to the lawn mower in such a position that it is parallel to the axis of the revolving knives, and so near to them that the file impinges against the knives when they are revolved. The follower 9 is moved backward and forward on this slide bar 8, so that every part of the cutting edges of the knives are subjected to its action and are sharpened. We have invented an adjustable method of holding the slide bar 8 in such positions. It consists of a holder, Fig. 2, which is provided with a lower arm 11 having two slots. These slots are for the passage of the bolts attached to the lawn mower, which hold the rollers in the frame and permit vertical adjustment. By taking the rollers of an ordinary lawn mower off and placing this arm 11 in the place of the adjustable lugs which hold the rollers, the holder is secured by bolts thereto. Two slots are provided, in order that it may be adjusted to different distances from the axis of the revolving knives, as may be required. The upper part of the holder consists of a frame 12 provided with set screws 13, in line of direction of the lawn mower as shown, for horizontal adjustment. In this upper frame 12 is placed an adjustable sleeve holder 14, Fig. 4, which is moved to and from the knives by the set screws. This sleeve holder 14 is provided with an orifice for the circular sleeve 15, which it is adapted to clamp in place by means of the set screw 17, one side being open for that purpose. The circular sleeves 15 have square holes for the passage of the slide bar and set screws 19 to clamp them to the same. They are also provided with shoulders 18 to prevent any end movement of the slide bars when in place.

The operation is as follows: The holders, Fig. 2, are attached to either side of and in front of the lawn mower (the roller being removed therefor) by means of the bolts which hold the supports of the roller in place. The slide bar 8 with its follower 9 mounted thereon is then placed through the square holes of the sleeves 15, and the set screw 19 of the sleeve fastens the sleeve securely to the bar, and then the collars 18 prevent any end movement of the slide bar 8. The sleeves 15 are placed in the sleeve holders 14 in the upper frame 12 of the bar holder. The file plate 10 is then adjusted to the proper angle so as to grind or file the spiral knives by turning the slide bar and sleeves 15, and is then secured in place by clamping the sleeve holders by means of the screws 17. The proper height is secured by moving the slotted parts 11 of the holder to the right elevation and then securing them in place by the bolts 20. The adjustment to the line of the axis of the revolving knives, and the proper contact pressure of the file against them is made by operating the set screws 13 which move the holding parts of the slide bar in the frame 12. The knives are then revolved against the file 10 by means of the common crank used as first described, and the follower is moved backward and forward on the slide bar until all parts of the cutting edges of the spiral knives are sufficiently subjected to the action of the file— the proper contact being maintained by the use of the set screws 13.

We do not illustrate a lawn mower of the class named, because they are well known to the art and familiar to the public, and their construction in this regard is universal, that is, all of them have a small wooden roller which is adjustable and detachable, for the purpose of determining the height of the cutting knives above the grass, and when such roller is removed, the attaching points furnish the means of attachment for the holders, Fig. 2, as described.

Having thus described our invention, what we claim as new, and desire to secure by Letters Patent, is—

1. In a knife sharpener for rotary lawn mowers, a slide bar as 8: a follower moving on said slide bar: grinding or sharpening material attached to said follower: holders adapted to be attached to the mower for holding the slide bar parallel with the axis of the revolving knives: and means to turn the slide bar so that the follower and its attached sharpening material shall be held at a given angle to the cutting edge of the knives.

2. In a knife sharpener for rotary lawn mowers, a slide bar having a follower provided with sharpening material mounted thereon: sleeves adapted to receive said slide bar and be secured thereto at adjustable distances from each other: sleeve holders adapted to be clamped upon the sleeves: holders for the slide bar adapted to be attached to the mower and hold said sleeve holders: and means to adjust the sleeve holders independently of each other, to and from the axis of the revolving knives.

3. In a knife sharpener for rotary lawn mowers, the sleeve holders 14: rotary sleeves 15: the slide bar holder 11, provided with the upper frame 12 and set screws 13: the slide bar 8: the follower 9: and the file 10, the parts being connected substantially as described.

In testimony whereof we hereunto subscribe our names, in the presence of two witnesses, this 8th day of December, A. D. 1893.

ISREAL ADAMS.
JOHN H. DOSWELL.

Witnesses:
  H. C. HARTMAN,
  H. C. COOLICAN.